United States Patent
Presland et al.

(10) Patent No.: US 12,542,724 B2
(45) Date of Patent: *Feb. 3, 2026

(54) ASSESSING NETWORK DEPENDENCIES AND LATENCIES IN MAINFRAME APPLICATION NETWORK TRAFFIC

(71) Applicant: Ensono, LLC, Downers Grove, IL (US)

(72) Inventors: Oliver C. B. Presland, Bursledon (GB); Michael J. Fontanetta, Cary, IL (US); Jeremy D. Strong, Monroe, WA (US)

(73) Assignee: ENSONO, LLC, Downers Grove, IL (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/390,992

(22) Filed: Dec. 20, 2023

(65) Prior Publication Data

US 2025/0211504 A1 Jun. 26, 2025

(51) Int. Cl.
*H04L 43/045* (2022.01)
*H04L 43/062* (2022.01)
*H04L 61/5007* (2022.01)

(52) U.S. Cl.
CPC .......... *H04L 43/045* (2013.01); *H04L 43/062* (2013.01); *H04L 61/5007* (2022.05)

(58) Field of Classification Search
CPC . H04L 43/045; H04L 43/062; H04L 61/5007; H04L 41/22; H04L 43/0852
See application file for complete search history.

(56) References Cited

U.S. PATENT DOCUMENTS

2013/0185021 A1  7/2013  Addison
2016/0373532 A1  12/2016 Ilan
(Continued)

FOREIGN PATENT DOCUMENTS

CN    115827405    3/2023

OTHER PUBLICATIONS

Pacific Systems Group—SMF Type 119 Record—Subtype 2, retrieved from http://www.pacsys.com/smf/smf119_subtype02.htm on Oct. 9, 2023.

*Primary Examiner* — Philip C Lee
(74) *Attorney, Agent, or Firm* — BRYAN CAVE LEIGHTON PAISNER LLP

(57) ABSTRACT

A computer-implemented method including obtaining records of TCP communications for a mainframe computing system for a time period. The method also can include generating, using the records, a first dataset including an inventory of IP entities that communicated with the mainframe computing system over TCP during the time period. The method additionally can include generating one or more visualizations based at least in part on information in the first dataset. The one or more visualizations can include a diagrammatic visualization including representations of LPARs of the mainframe computing system, system groups of the IP entities, and respective volumes of network traffic between the mainframe computing system and the system groups of the IP entities for the time period. The method further can include generating an allocation of the IP entities into rings representing respective potential latency sensitivities. The method additionally can include causing to be displayed outputs including the one or more visualizations and the allocation of the IP entities. Other embodiments are described.

20 Claims, 8 Drawing Sheets

(56) References Cited

U.S. PATENT DOCUMENTS

| | | |
|---|---|---|
| 2018/0137154 A1 | 5/2018 | Reichert |
| 2020/0366758 A1* | 11/2020 | Chauhan ................ H04L 67/75 |
| 2021/0037030 A1 | 2/2021 | Marion |
| 2022/0052968 A1 | 2/2022 | Catalano |
| 2022/0191226 A1 | 6/2022 | Chan |
| 2023/0186170 A1 | 6/2023 | Akbiyik |
| 2023/0214265 A1 | 7/2023 | Dong et al. |

* cited by examiner

| System Group | # IPs | Total Traffic (MB) ↓ | Total # TCP Connections |
|---|---|---|---|
| Core DC 1 Servers | 632 | 132,911,432 | 71,322,543 |
| Public Cloud | 1,245 | 32,355,213 | 5,983,069 |
| Core DC 2 Servers | 310 | 20,111,193 | 15,181,059 |
| US Mainframe (MF-MF) | 35 | 2,220,234 | 312,517 |
| Unknown | 29 | 1,313,225 | 499,327 |
| Servers and VDI (outside Core DCs) | 573 | 262,770 | 49,150 |
| London Mainframe | 8 | 46,422 | 31,093 |
| Extranet / 3rd Party VPN | 7 | 22,060 | 22,271 |
| Core DC 1 End User Network | 722 | 18,852 | 8,932 |
| Core DC 2 End User Network | 693 | 4,992 | 4,311 |
| Core DC 2 VDI | 214 | 1,983 | 1,733 |
| Core DC 1 VDI | 221 | 3,249 | 2,442 |
| End User Network (outside Core DCs) | 153 | 354 | 7,243 |
| LAN Printers | 201 | 311 | 6,937 |
| TOTALS | 5,043 | 189,272,290 | 93,432,727 |

| Day of Week | Total Traffic Volume (MB) | | Total TCP Connections | |
|---|---|---|---|---|
| Monday | 7,192,347 | 3.80% | 12,239,687 | 13.10% |
| Tuesday | 27,444,482 | 14.50% | 16,537,593 | 17.70% |
| Wednesday | 38,422,275 | 20.30% | 16,631,025 | 17.80% |
| Thursday | 35,772,463 | 18.90% | 16,163,862 | 17.30% |
| Friday | 39,368,636 | 20.80% | 15,509,833 | 16.60% |
| Saturday | 31,229,928 | 16.50% | 8,502,378 | 9.10% |
| Sunday | 10,031,431 | 5.30% | 7,848,349 | 8.40% |
| Grand Total | 189,272,290 | | 95,432,727 | |

ASSESSING NETWORK DEPENDENCIES AND LATENCIES IN MAINFRAME APPLICATION NETWORK TRAFFIC

TECHNICAL FIELD

This disclosure relates generally to analyzing, visualizing, and assessing mainframe application network traffic, including assessing network dependencies and latencies therein.

BACKGROUND

Organizations that use IBM mainframe computers often find it challenging to determine a complete and accurate view of all computer systems and network devices that communicate with their mainframe systems, to identify dependencies between these information technology (IT) components. Furthermore, the network traffic profile of these communications between systems are often poorly understood. There is inherent business application performance risk associated with a lack of detailed understanding of these dependencies and communications between systems. These risks can manifest in various scenarios, most commonly when either (i) a change to an application or its supporting infrastructure is made, or (ii) when a system involved in these communications is moved to another physical location, creating an increased network latency that affects network communications. Accordingly, there is a need for analysis, correlation and interpretation of data associated with these communications to deliver an output that provides a comprehensive view of application and system network communication dependencies, the properties of these communications, and to categorize applications and systems by level of risk of susceptibility to network latency impact on application performance.

BRIEF DESCRIPTION OF THE DRAWINGS

To facilitate further description of the embodiments, the following drawings are provided in which:

FIG. 6A illustrates an exemplary table that summarizes communications by a mainframe computing system with the IP entities by system group;

FIG. 6B illustrates an exemplary table that summarizes communications by the mainframe computing system by a day-of-week traffic profile.

Figure 1:
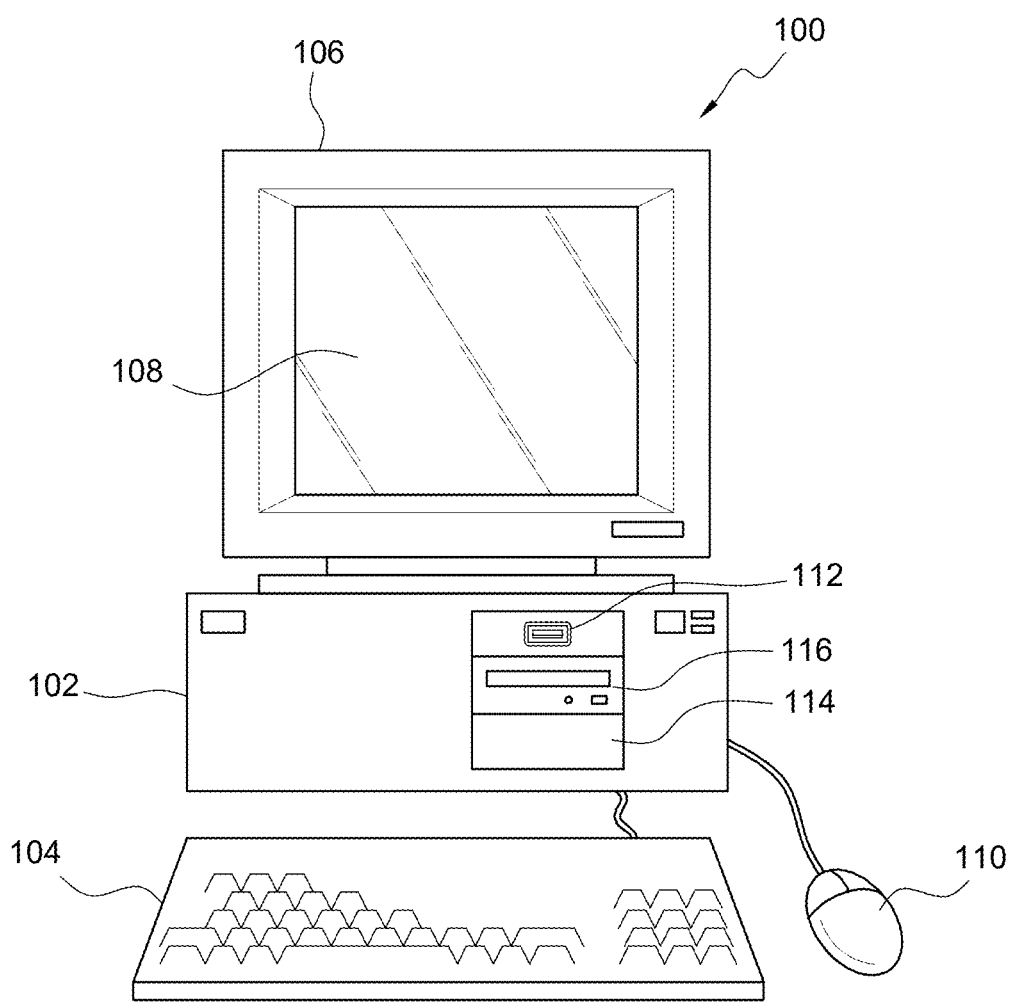
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

DESCRIPTION OF EXAMPLES OF EMBODIMENTS

In several embodiments, the systems and methods described herein can provide for identification and categorization of communications between IBM z/OS-based mainframe computers and other IT systems, over the Transmission Control Protocol (TCP) network protocol, combined with IT systems asset inventory data, and application inventory data to determine network latency sensitivity risk ratings for business applications and systems that communication with the mainframe.

The systems and methods can perform analysis of IBM mainframe application network traffic and communications with non-mainframe computer systems to determine network dependencies, profile the nature of these network communications, combine with IT systems asset inventory data, and application inventory data to assess applications' and systems' level of susceptibility to performance impact due to increased network latency.

Various embodiments include a computer-implemented method. The method can include obtaining records of TCP communications for a mainframe computing system for a time period. The method also can include generating, using the records, a first dataset including an inventory of IP entities that communicated with the mainframe computing system over TCP during the time period. The method additionally can include generating one or more visualizations based at least in part on information in the first dataset. The one or more visualizations can include a diagrammatic visualization including representations of LPARs of the mainframe computing system, system groups of the IP entities, and respective volumes of network traffic between the mainframe computing system and the system groups of the IP entities for the time period. The method further can include generating an allocation of the IP entities into rings representing respective potential latency sensitivities. The method additionally can include causing to be displayed outputs including the one or more visualizations and the allocation of the IP entities.

A number of embodiments include a system including one or more processors and one or more non-transitory computer-readable media storing computing instructions that, when executed on the one or more processors, cause the one or more processors to perform various operations. The operations can include obtaining records of TCP communications for a mainframe computing system for a time period. The operations also can include generating, using the records, a first dataset including an inventory of IP entities that communicated with the mainframe computing system over TCP during the time period. The operations additionally can include generating one or more visualizations based at least in part on information in the first dataset. The one or more visualizations can include a diagrammatic visualization including representations of LPARs of the mainframe computing system, system groups of the IP entities, and respective volumes of network traffic between the mainframe computing system and the system groups of the IP entities for the time period. The operations further can include generating an allocation of the IP entities into rings representing respective potential latency sensitivities. The operations additionally can include causing to be displayed outputs including the one or more visualizations and the allocation of the IP entities.

Figure 2:
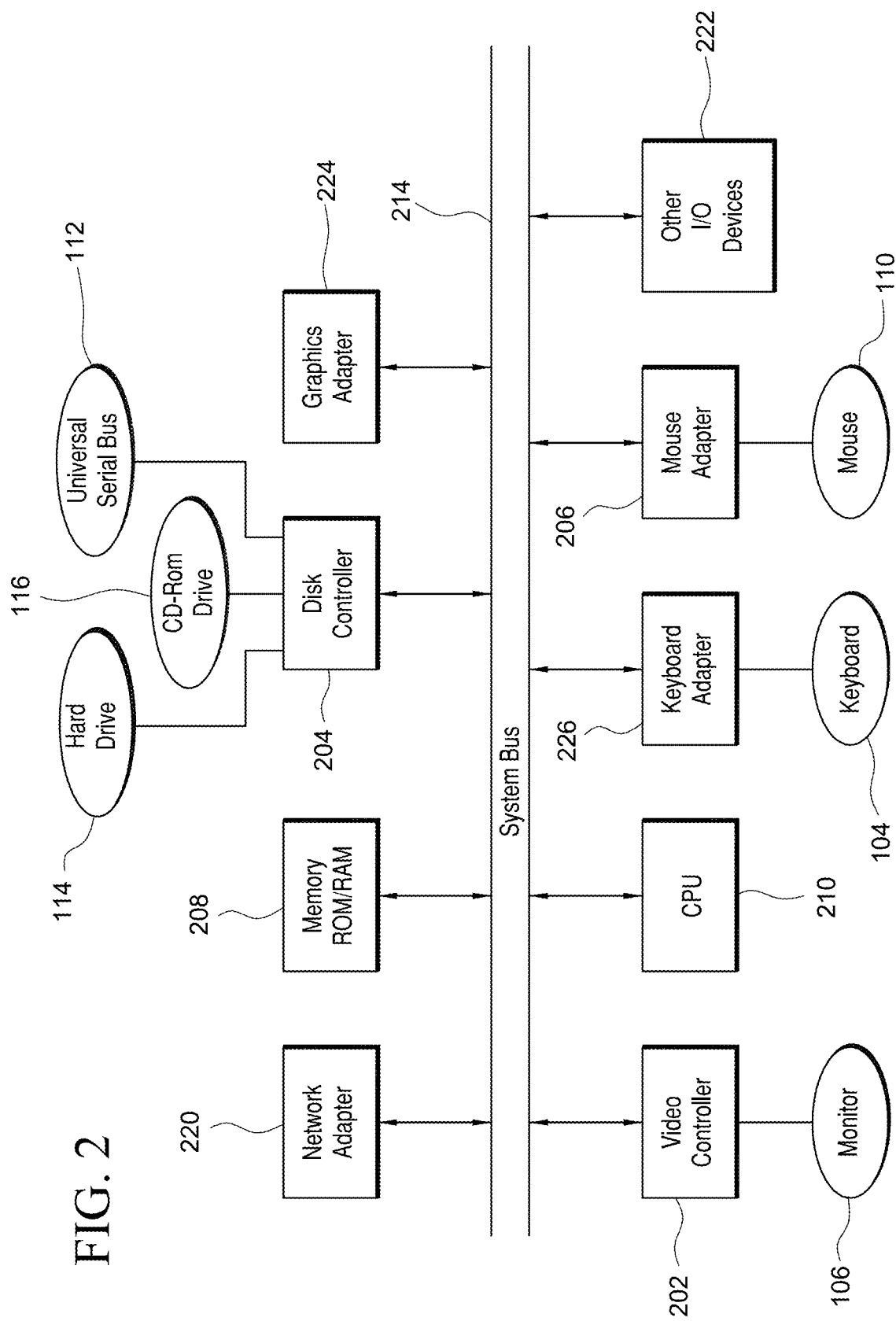
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or DVD, Blu-Ray, or other suitable media, such as media configured to be used in DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a DVD in DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
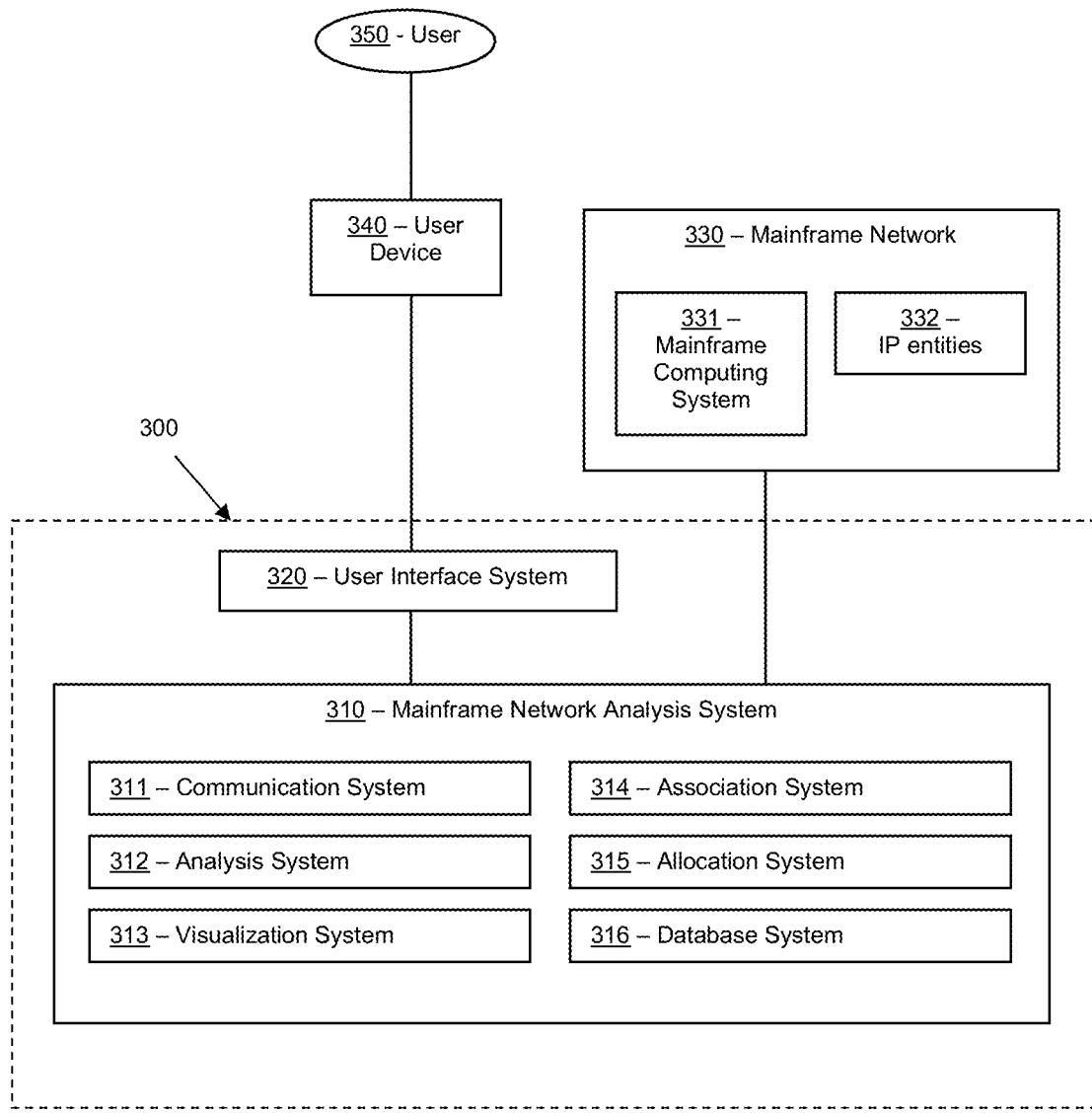
FIG. 3 illustrates a block diagram of a system that can be employed for assessing network dependencies and latencies in mainframe application network traffic, according to an embodiment.

Turning ahead in the drawings, FIG. 3 illustrates a block diagram of a system 300 that can be employed for assessing network dependencies and latencies in mainframe application network traffic, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a mainframe network analysis system 310 and/or a user interface system 320. Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Mainframe network analysis system 310 and/or user interface system 320 can each be a computer system, such as computer system 100 (FIG. 1), as described above, and can each be a single computer, a single server, or a cluster or collection of computers or servers, or a cloud of computers or servers. In another embodiment, a single computer system can host mainframe network analysis system 310 and user interface system 320. In some embodiments, mainframe network analysis system 310 can be integrated with user interface system 320. Additional details regarding mainframe network analysis system 310 and/or user interface system 320 are described herein.

In some embodiments, user interface system 320 can be in data communication through a network (e.g., the Internet or another suitable network) with one or more user devices, such as a user device 340. User device 340 can be per of system 300 or external to system 300. In a number of embodiments, the user devices (e.g., 340) can be used by users, such as a user 350. In many embodiments, user interface system 320 can host one or more websites and/or mobile application servers. For example, user interface system 320 can host a website, or provide a server that interfaces with an application (e.g., a mobile application), on user device 340, which can allow users (e.g., 350) to interface with mainframe network analysis system 310. In some embodiments, an internal network that is not open to the public can be used for communications between mainframe network analysis system 310 and user interface system 320 within system 300. In other embodiments, mainframe network analysis system 310 and user interface system 320 can communicate through a public network, such as the Internet.

In many embodiments, mainframe network analysis system 310 can be in data communication with a mainframe network 330. Mainframe network 330 can include a mainframe computing system 331 and IP (Internet Protocol) entities 332, which can be devices that communicate with mainframe computing system 331. For example, mainframe computing system 331 can be an IBM z/OS computer system. Examples of IP entities include servers, printers, other mainframe computing systems, virtual desktop infrastructures (VDIs), networks, and/or other suitable IT (Information Technology) systems.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand.

Exemplary mobile devices can include (i) an iPod®, iPhone®, iTouch®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, or (ii) the Android™ operating system developed by the Open Handset Alliance.

In many embodiments, mainframe network analysis system 310 and/or user interface system 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to mainframe network analysis system 310 and/or user interface system 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of mainframe network analysis system 310 and/or user interface system 320. In a similar manner, the processors and/or the non-transitory computer-readable media can be local and/or remote to each other.

Meanwhile, in many embodiments, mainframe network analysis system 310 and/or user interface system 320 also can be configured to communicate with one or more databases, such as a database system 316. The one or more databases can store inputs, constraints, data structures, outputs, and/or other suitable information. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP Database, and IBM DB2 Database.

Meanwhile, communication between mainframe network analysis system 310 and/or user interface system 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, mainframe network analysis system 310 can include a communication system 311, an analysis system 312, a visualization system 313, an association system 314, an allocation system 315, database system 316, and/or other suitable systems and/or databases. In many embodiments, the systems of mainframe network analysis system 310 can be modules of computing instructions (e.g., software modules) stored at non-transitory computer readable media that operate on one or more processors. In the same or other embodiments, one of more of the systems of mainframe network analysis system 310 can be implemented in hardware. The systems of mainframe network analysis system 310 described herein are merely exemplary, and other suitable arrangements of systems within mainframe network analysis system 310 are contemplated. The systems of mainframe network analysis system 310 are described below in further detail. In some embodiments, mainframe network analysis system and/or user interface system 320 can be part of one or more of the components of mainframe network 330.

Figure 4:
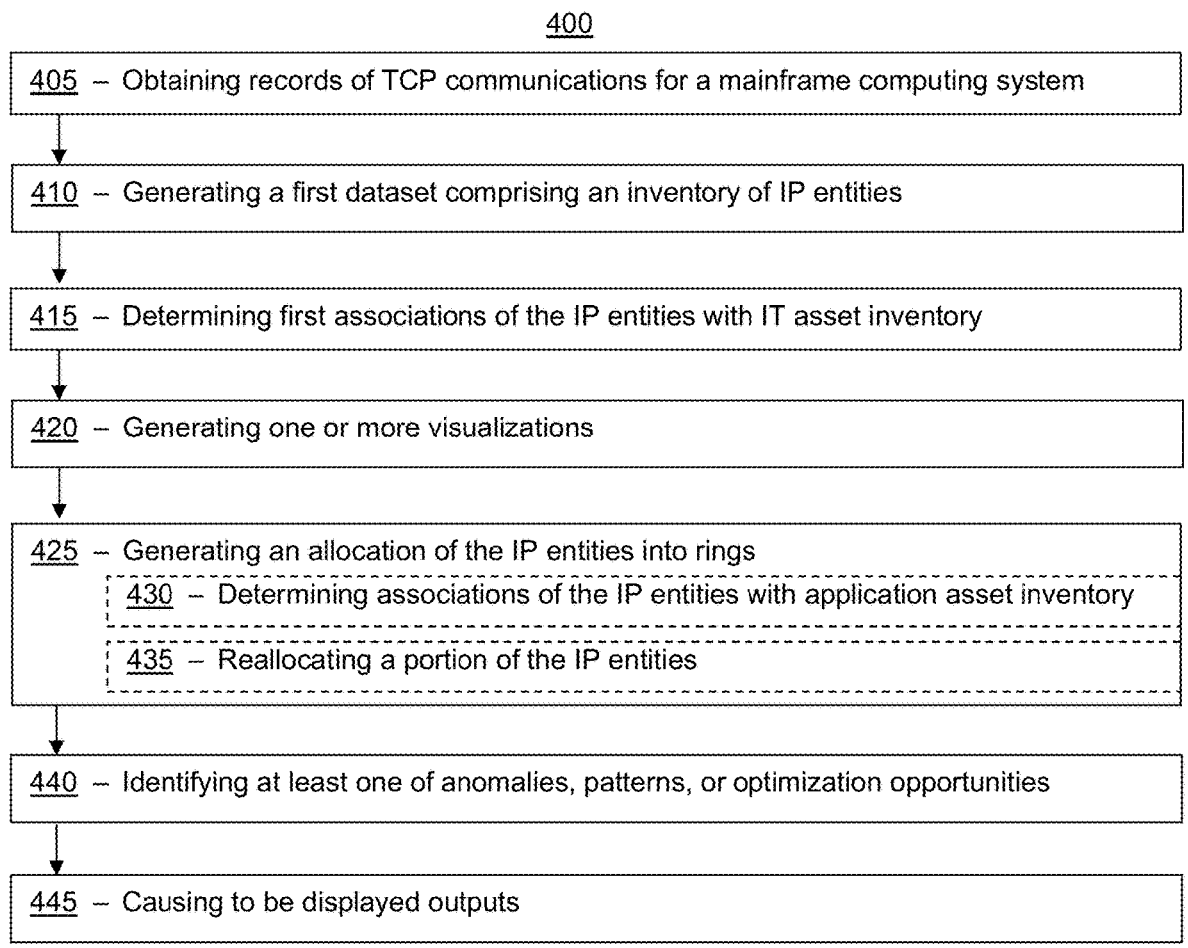
FIG. 4 illustrates a flow chart for a method of assessing network dependencies and latencies in mainframe application network traffic, according to an embodiment.

Turning ahead in the drawings, FIG. 4 illustrates a flow chart for a method 400 of assessing network dependencies and latencies in mainframe application network traffic, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), mainframe network analysis system 310 (FIG. 3), and/or user interface system 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3), mainframe network analysis system 310 (FIG. 3), and/or user interface system 320 (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include an activity 405 of obtaining records of TCP communications for a mainframe computing system for a time period. Mainframe event logging on mainframe computing system 331 (FIG. 3) can be managed by a subcomponent of the IBM z/OS operating system named the System Management Facilities (SMF). Log information relating to TCP/IP network activity, which involves the mainframe networking stack on IBM z/OS, can be captured as SMF log records for each TCP network connection. TCP Termination events can be captured and written to standard SMF Type 119 Subtype 2 record format. In many embodiments, the records obtained in activity 405 can include the SMF Type 119 Subtype 2 records. Mainframe computing system 331 (FIG. 3) can be configured to capture the SMF Type 119 Subtype 2 (TCP Termination) records for all or a portion of TCP communications at a configurable verbosity level that can be specified. In many embodiments, a copy of these SMF Type 119 Subtype 2 (TCP Termination) records can be extracted mainframe computing system 331 (FIG. 3) for a time period. The time period can encompass peak processing and/or regular business activities. The extracted records can be large, often in the millions of records, or of another suitable size. In many embodiments, the records can be converted into a compressed format and transferred to mainframe network analysis system 310 (FIG. 3) for analysis. In some embodiments, communication system 311 (FIG. 3) can obtain these records and store them in database system 316 (FIG. 3).

In several embodiments, method 400 also can include activity 410 of generating, using the records, a first dataset including an inventory of IP entities that communicated with the mainframe computing system over TCP during the time period. In many embodiments, the first dataset further can include network traffic patterns, traffic volumes, traffic properties, and/or other suitable information associated with the IP entities. In some embodiments, analysis system 312 (FIG. 3) can at least partially perform activity 410.

For example, upon successful receipt of the raw input SMF data and upload to mainframe network analysis system 310, decompression from 'tersed' format can be performed, integrity checks can then be performed by scripts to validate the data format and suitability for processing. The records can be processed using the various programs, routines, scripts, etc., such as the scripts described below, to produce a dataset specific to the requirements of subsequent analysis, by reducing the SMF records to fields that are involved in the analysis and/or performing grouping and/or aggregating of the data associated with each unique combination of attributes as described below.

For example, the unique combination defining each row of resultant data can be based on the following attributes (but other suitable attributes can be used in other embodiments):
1. Date (calendar day);
2. Mainframe System ID (LPAR (logical partition) name);
3. Local IP address (Internet Protocol version 4 and/or version 6);
4. Local TCP port number;
5. Remote IP address (Internet Protocol version 4 and/or version 6);

6. TCP socket resource name (mainframe service); and
7. RACF (Resource Access Control Facility) username.

Other attributes associated to each row of data produced, based on unique combination match above, can include:
1. Count of connections (frequency);
2. Total traffic volume inbound (in bytes);
3. Total traffic volume outbound (in bytes);
4. Total TCP segments inbound (count); and
5. Total TCP segments outbound (count).

In many embodiments, the output data set (the first dataset) can be imported into a database schema, as described below, which can be used throughout the analysis. In some embodiments, this dataset can be a comprehensive inventory of IP entities that communicated with the mainframe over Transmission Control Protocol (TCP) during the time period under analysis, with details of associated traffic patterns, volumes, and traffic properties, as detailed above.

Various scripts can be written in one or more languages, such as JCL, SAS, and/or Python, which can be executed on commercially available frameworks, to process the records. In many embodiments, these scripts can process raw SMF records, perform an integrity check, then aggregate the data records and group by specific data fields, convert the data to a comma separated values (CSV) format, and import into the database schema ready for subsequent analysis.

An exemplary JCL script can execute processing commands, such as MXG processing commands (MXG is a commercial software product), to transform the raw SMF binary data and structure it into a SAS Performance Database Format (PDB) format. An exemplary SAS script can selectively aggregate and join specific data fields and values from the Performance Database Format (PDB) to a CSV format containing the following information:
1. Local IP address by mainframe logical partition (LPAR);
2. Remote IP address by LPAR;
3. Traffic volume (bytes);
4. Traffic frequency (connection count for each matched data profile during the period under analysis);
5. TCP session duration (seconds);
6. Ports in use by TCP session (local and remote);
7. Mainframe Security ID in use;
8. Mainframe application or service name;
9. Success rate (transmission failures);
10. Time frame is configurable to focus the dataset output as required.

An exemplary Python script can then load information from the CVS format to the relational database schema.

An exemplary database schema can include the following three tables:

TABLE 1: NETWORK TRAFFIC DETAILS (contains post-processed SMF aggregated data)
DATE
SYSTEMID
LOCALIP
LOCALPORT
REMOTEIP
TCPSOCKETRESOURCENAME
RACFUSERNAME
TYPE
FREQ
TOT_INBOUNDSEGMENTCOUNT
TOT_OUTBOUNDSEGMENTCOUNT
TOT_INBOUNDBYTECOUNT
TOT_OUTBOUNDBYTECOUNT Optional Fields
AV_INBOUNDBYTECOUNT
AV_OUTBOUNDBYTECOUNT.
MAX_INBOUNDBYTECOUNT
MAX_OUTBOUNDBYTECOUNT
AV_INBOUNDSEGMENTCOUNT
AV_OUTBOUNDSEGMENTCOUNT
MAX_INBOUNDSEGMENTCOUNT
MAX_OUTBOUNDSEGMENTCOUNT TABLE 2: PER REMOTE IP ADDRESS DETAILS (contains IT Asset Management (ITAM) and IP Address Management (IPAM))
IPADDRESS
PUBLIC_PRIVATE
SUBNET_MASK
SUBNET_DESC
COUNTRY
PHYSLOCATIONID
ITAM_ID
HOSTNAME
FQDN
ITAM_HOSTTYPE
DIAGGROUP
RINGALLOCATION
APP_SUBSYS_DESC
APPLICATIONS TABLE 3: APPLICATION DETAILS (contains application attributes for each Application associated to each IP Address)
SWPACKAGE_ID
APPCOMPONENTNAME.
PROD_NONPROD
SWOWNER
CRITRATING
MULTIAPPONHOST_FLAG
CUSTOM_KNOWL In a number of embodiments, method 400 additionally can include activity 415 of determining first associations of the IP entities with IT asset inventory information.

In several embodiments, the first dataset can be updated and/or extended based on these first associations. In some embodiments, association system 314 (FIG. 3) can at least partially perform activity 415.

For example, for each IP entity observed communicating with mainframe computing system 331 (FIG. 3), details are added to the first dataset from IT asset inventory information for the estate under analysis. A record can be created and linked to each IP entity with various fields, such as the following fields (but other embodiments can include other suitable fields), populated based on available data:
1. REMOTEIP (IP address used as common key);
2. PUBLIC_PRIVATE (is the IP in a public or private subnet);
3. SUBNET_MASK (for IP subnet in which IP entity resides);
4. SUBNET_DESC (field identifying network zone or segment type in which IP entity resides);
5. COUNTRY (location of IP entity);
6. PHYS_LOCATION (office building, town, data center identifier, etc.);
7. ITAM_ID (unique asset management system identifier for IP entity);
8. HOSTNAME (IP entity network name);
9. FQDN (IP entity fully qualified domain name);
10. ITAM_HOSTTYPE (IP entity type such as Windows server, Linux server, mainframe, load balancer, etc.);

11. DIAGGROUP (can be populated during activity 420, described below, to identify which grouping the IP entity belongs to);
12. RINGALLOCATION (can be populated during activity 425, described below, to identify the initial and subsequent 'Ring' allocation of each IP entity); and
13. APP_SUBSYS_DESC (can be populated during activity 420, described below, to identify the type of device in normalized taxonomy used by the analysis, informed by other field contents in the record).

In several embodiments, method 400 further can include an activity 420 of generating one or more visualizations based at least in part on information in the first dataset, which can the first dataset was extended in activity 415. In some embodiments, visualization system 311 (FIG. 3) can at least partially perform activity 420.

In many embodiments, database queries can run based on distinct system group (DIAGGROUP) values to do various operations, such as:

1. Count IP entities in each DIAGGROUP;
2. Sum the total bytes of traffic (in+out) transferred between the IP entities in each DIAGGROUP and the mainframe during the period under analysis;
3. Sum the total bytes of traffic (in+out) transferred between mainframe IP entities during the period under analysis;
4. Sum the total number of TCP connections between the IP entities in each DIAGGROUP and the mainframe during the period under analysis; and
5. Sum the total number of TCP connections between mainframe IP entities during the period under analysis.

Figure 5:
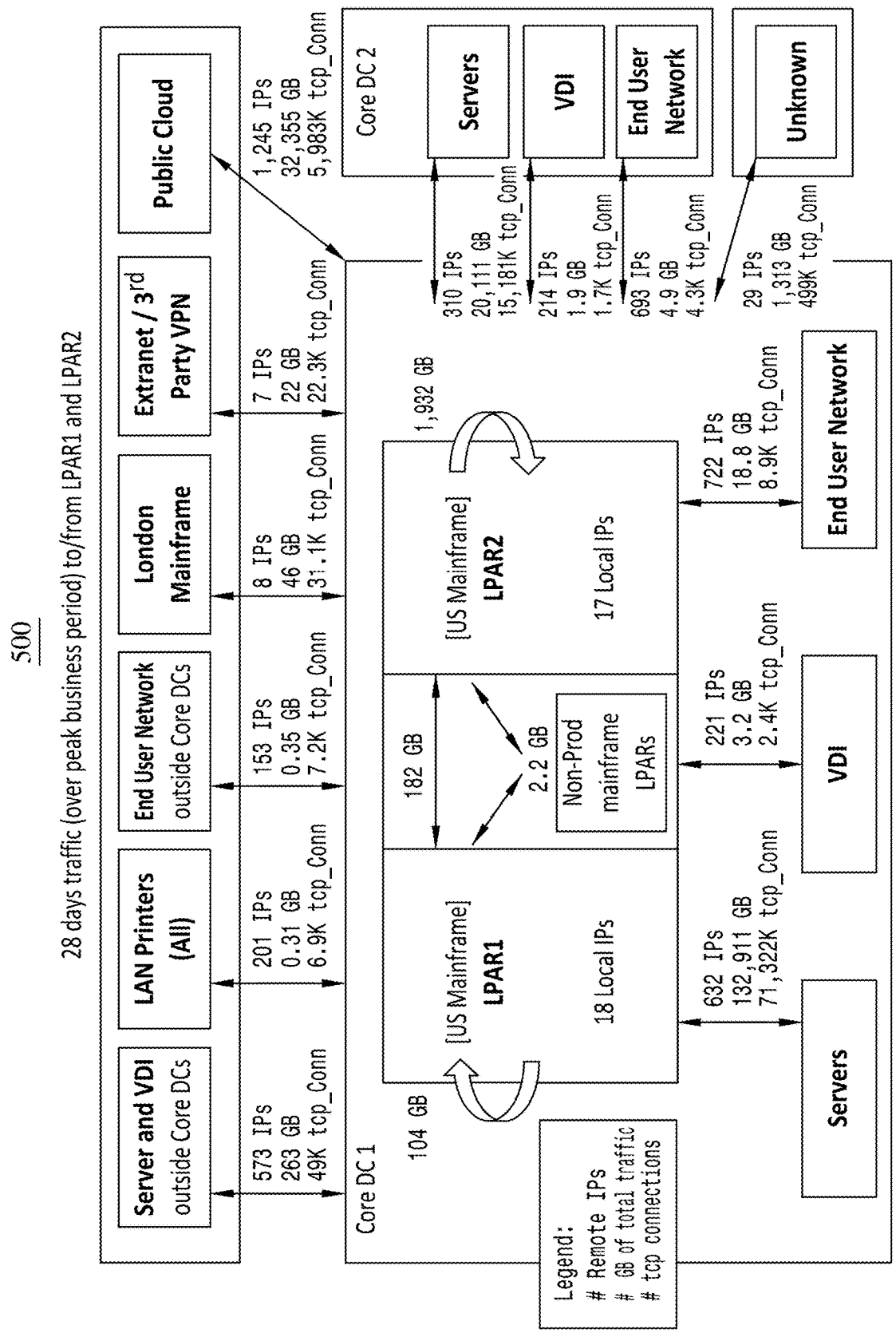
FIG. 5 illustrates an exemplary diagrammatic visualization of a mainframe network.

In some embodiments, the one or more visualizations can include a diagrammatic visualization including representations of LPARs of the mainframe computing system, system groups of the IP entities, respective volumes of network traffic between the mainframe computing system and the system groups of the IP entities for the time period, and/or other suitable information. For example, using database queries, the diagrammatic visualization can include the mainframe system LPARs and each DIAGGROUP, as well as the geographic topology of all DIAGGROUPs, the number of IP entities in each DIAGGROUP, the volume of network traffic that passed between them and the mainframe, the volume of traffic between mainframe LPARs, the count of TCP connections between DIAGGROUPs and the mainframe, and the count of TCP connections between mainframe LPARs; during the period under analysis. For example, FIG. 5 illustrates an exemplary diagrammatic visualization 500 of a mainframe network (e.g., 330 (FIG. 3)). Diagrammatic visualization 500 is for an exemplary time period of 28 days involving a mainframe computing system with two production LPARs, namely LPAR1 and LPAR2, in a core data center 1 (DC1), which communicates with various IP entities in a core data center 2 (DC2) and elsewhere, such as various servers, VDIs, LAN printers, end user networks, etc., in various system groups. As shown in FIG. 5, diagrammatic visualization 500 includes the number of remote IPs in each system group, the number of gigabytes (GB) of total traffic, and the number of TCP connections. Additionally, traffic amongst the LPARs is shown.

In many embodiments, the one or more visualizations further can include a first table showing, for each system group of the system groups for the time period, a respective traffic total to and from the mainframe computing system for the system group, a respective number of the IP entities in the system group, a respective number of TCP connections between the system group and the mainframe computing system, and/or other suitable information. For example, FIG. 6A illustrates an exemplary table 610 that summarizes communications by the mainframe computing system (e.g., 331 (FIG. 3)) with the IP entities by system group (DIAGGROUP). As shown in FIG. 6A, the number of IPs in each system group is listed, along with the total traffic (in megabytes (MB)), on which the data is sorted (highest traffic at top), and the total number of TCP connections. Colors or shading can be used in the table in some embodiments to show relative amounts.

In several embodiments, the one or more visualizations further can include a second table showing, for each day of weeks of the time period, a respective traffic total to and from the mainframe computing system, a respective number of TCP connections to the mainframe computing system, and/or other suitable information. For example, FIG. 6B illustrates an exemplary table 620 that summarizes communications by the mainframe computing system (e.g., 331 (FIG. 3)) by a day-of-week traffic profile. As shown in FIG. 6B, listed in table 620 is the total traffic volume in megabytes and the respective percentage for each day, along with the total TCP connections and the respective percentage for each day. Colors or shading can be used in the table in some embodiments to show relative amounts.

In some embodiments, the one or more visualizations further can include a third table showing network traffic segmented by mainframe services and mainframe services groupings. For example, using database queries, statistics can be generated to identify which common TCP ports (e.g., 1-1023) are being used for communication between IP entities and the mainframe computing system. Using database queries, high TCP ports (e.g., 1024-65535) in use can be identified, and based on traffic volumes, can be segmented by dynamic port usage and fixed value port usage. The common and high fixed value port usage can be mapped in the database to mainframe services or grouped by mainframe services (which can be identified through TCP socket resource names) sharing a common naming convention and representing a specific class of services in the analysis database. Mainframe services that use dynamics ports can be identified in the database. Database queries can enable reports to be run across the relationships between mainframe services, connecting ports and IP entities. A summary table can be generated to segment traffic by mainframe services and mainframe services groupings.

Returning to FIG. 4, in a number of embodiments, method 400 additionally can include activity 425 of generating an allocation of the IP entities into rings representing respective potential latency sensitivities. In some embodiments, allocation system 315 (FIG. 3) can at least partially perform activity 425. In many embodiments, each of the IP entities can be allocated into one of the rights. Ring allocation can be used to segment IP entities based on the potential risk of latency sensitivity and risk of performance impact if these IP entities were moved to a future-state location with increased network separation from the mainframe computing system.

An example of ring definitions is as follows:

1. Ring 0: Integral components of the mainframe computing system under analysis identified via an IP entity.
2. Ring 1: Non-mainframe IP entities that have been identified as tightly coupled with the mainframe computing system and at high risk of application performance if latency increases.
3. Ring 2: Non-mainframe IP entities that are dependent on the mainframe computing system but further investigation can be involved to determine the latency risk assessment.

4. Ring 3: Non-mainframe IP entities identified at no or negligible risk of performance risk if latency increases between them and the mainframe computing system.

Initial allocation of the IP entities can be conducted as follows:
1. All IP entities associated to the mainframe computing system under analysis are allocated to Ring 0.
2. All IP entities identified on a network segment or at a physical location that is remote from the mainframe computing system and subject to higher latency are allocated to Ring 3.
3. Initially all other IP entities are allocated to Ring 2.

Figure 7:
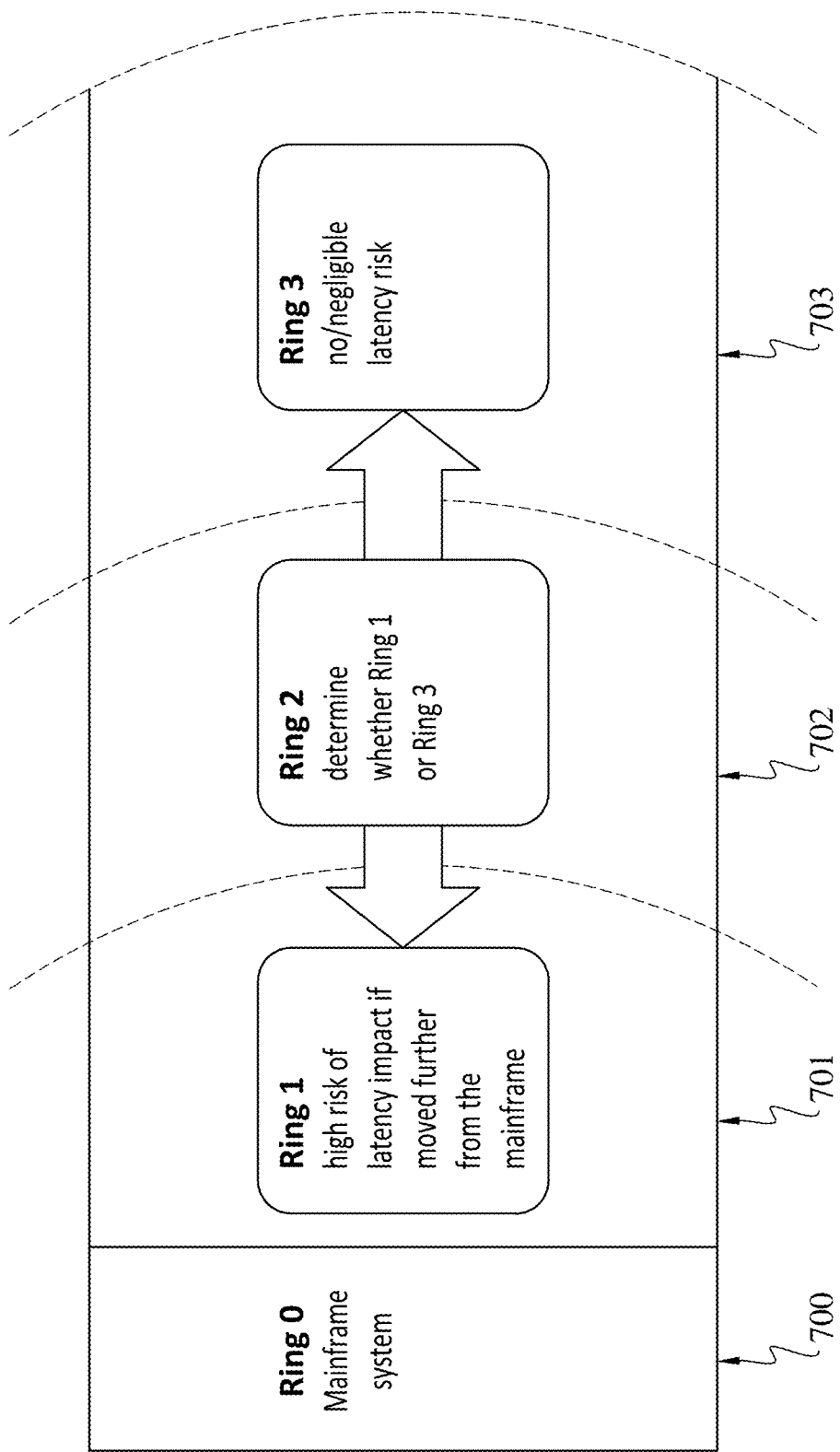
FIG. 7 shows a diagram of rings for allocation of the IP entities.

After the initial allocation, a further assessment, as described below in connection with activity 430 and activity 435, can be performed to reallocate IP entities in Ring 2 to either Ring 1 (high risk latency impact if moved further from the mainframe computing system) or Ring 3 (no/negligible latency risk). FIG. 7 shows a diagram of rings 700-703, representing Rings 0-3 respectively, for allocation of the IP entities. As shown in FIG. 7, IP entities in ring 702 (Ring 2) will generally be reallocated to either ring 701 (Ring 1) or ring 703 (Ring 3). In many embodiments, the reallocation can be based on using a rules-based assessment.

After the reallocation is completed, there may still be some residual IP entities in Ring 2, typically this is where inadequate information was available in either activity 415 (FIG. 4) or activity 430 (FIG. 4) to determine whether such IP entities should be allocated to Ring 1 or Ring 3. Residual Ring 2 IP entities can involve further investigation, such as human-based investigation.

Returning to FIG. 4, in several embodiments, activity 425 can include an activity 430 of determining second associations of the IP entities with application asset inventory information. Business applications can add a further layer to the analysis. These applications may individually reside on a single IP entity (e.g., a server), or components of a single application may reside across many different IP entities (e.g., multiple servers). Applications also can be co-hosted, in which components of multiple applications reside on the same IP entity. In some embodiments, all IP entities associated to a single application can be grouped for allocation to either Ring 1 or Ring 3. To enable this allocation, additional application asset inventory information can be added to the first dataset (to further update and/or extend the first dataset) to provide details and identification of applications and their association to IP entities.

A record can be created and linked to each IP entity with the various fields, such as the following fields, which can be populated based on available data:
1. SWPACKAGE_ID (a unique identifier for each application);
2. APPCOMPONENTNAME (multi-value field that contains the name identifying each component on any application present on the IP entity);
3. PROD_NONPROD (whether the application is a production, non-production, or disaster recovery instance of the application on the IP entity);
4. SWOWNER (a business owner of the applications; an individual or team identifier);
5. CRITRATING (where applicable an identifier that indicates the relative importance of the business application);
6. MULTIAPPONHOST_FLAG (a field populated during the analysis to identify IP entities on which multiple applications have installed components); and
7. CUSTOM_KNOWL (a field that captures information relating to the application captured during interviews with the SWOWNER).

In a number of embodiments, activity 425 also can include an activity 435 of reallocating at least a portion of the IP entities among the rings using a rules-based assessment. Based on the analysis and the first dataset developed and extended to this point, a series of rules can be applied to the application estate under analysis. These rules can represent patterns that indicate either high or no/negligible latency risk for an application and its communication with the mainframe computing system, based on the information that is now present in the dataset. Rules can be validated with IT subject matter experts (commonly the SWOWNER) before being applied.

These rules can then be applied to the entities in Ring 2 to reallocate them to Ring 1 or Ring 3. As an example, non-mainframe applications that communicate with a mainframe IBM Db2 database at high frequency and requesting non-trivial volumes of data are known to have users expecting a high-performance response to their user interface for these requests. The associated rule might be: if the IP entities associated to a specific application are communicating on an identified Db2 specific port X, with a frequency exceeding Y and data volume exceeding Z, and the CUSTOM_KNOWL field for the applications contains 'Transactional UI', then all associated IP entities are reallocated to Ring 1.

As another example, non-mainframe applications that communicate only with a mainframe via file transfer service, regardless of frequency or volume, are known to have lower latency risk. The associated rule might be: if the IP entities associated to a specific application are only communicating with the mainframe on an identified file transfer service port and the MULTIAPPONHOST_FLAG='NO', then all associated IP entities are reallocated to Ring 3.

The development and/or application of rules to the Ring 2 entities can continue until either all entities have been allocated to either Ring 1 or Ring 3, or inadequate information is available for the remaining Ring 2 entities to be reallocated, and a residual set of entities reside in Ring 2.

In several embodiments, method 400 additionally can include activity 440 of identifying at least one of anomalies, patterns, or optimization opportunities based at least in part of the first dataset, the first associations, and the second associations. In some embodiments, analysis system 312 (FIG. 3) can at least partially perform activity 440. During the course of analysis and database queries run against the dataset as part of method 400, anomalies can be detected, or observations can be made, which can be valuable and warrant further investigation.

Examples can include specific very high data transfer volumes or high frequency connections. One such example can be when the List of REMOTEIP entities where PHYSLOCATIONID='Core DC 1' and (TOT_INBOUNDSEGMENTCOUNT+TOT_OUTBOUNDSEGMENTCOUNT)>1,000,000,000 Bytes. Another such example can be when the List of REMOTEIP entities where PHYSLOCATIONID='Core DC 2' and FREQ>100,000.

Other examples can include systems that were not expected to be communicating in the mainframe. For example, unexpected communications from IP entities, which can be validated during workshops with SWOWNER when reports generated during analysis are reviewed.

Additional examples can include insecure network protocols in use that do not comply with organization policies. For example, the List of IP entities communicating with mainframe on LOCALPORT=23. This identifies Telnet traffic. A best practice for security can recommend use of protocols such as SSH to be used as more secure than the Telnet protocol.

Further examples can include communications with external 3rd party networks that were unexpected. For example, unexpected communications with the mainframe from IP entities in Extranet/3rd party VPN networks, which can be validated during workshops with SWOWNER when reports generated during analysis are reviewed.

In a number of embodiments, method 400 further can include an activity 445 of causing to be displayed outputs including the one or more visualizations and the allocation of the IP entities. In some embodiments, the outputs further can include at least one of the anomalies, the patterns, or the optimization opportunities identified in activity 440. For example, the outputs can be displayed to user 350 (FIG. 3) on user interface on user device 340 (FIG. 3) provided by user interface system 320 (FIG. 2). In some embodiments, communication system 311 (FIG. 3) can at least partially perform activity 445.

In many embodiments, method 400 can beneficially provide for the analysis of IBM mainframe application network traffic and communications with non-mainframe computer systems and applications, to determine network dependencies, profile the nature of these network communications and categorize applications and systems' level of susceptibility to performance impact due to increased network latency.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although assessing network dependencies and latencies in mainframe application network traffic has been described with respect to specific embodiments, it will be understood by those skilled in the art that various changes may be made without departing from the spirit or scope of the disclosure.

Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the components within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:
    obtaining records of TCP communications for a mainframe computing system for a time period;
    generating, using the records, a first dataset comprising an inventory of IP entities that communicated with the mainframe computing system over TCP during the time period;
    generating an allocation of the IP entities into rings representing respective potential latency sensitivities; and
    causing to be displayed one or more outputs comprising the allocation of the IP entities.

2. The computer-implemented method of claim 1 further comprising:
    determining first associations of the IP entities with IT asset inventory information.

3. The computer-implemented method of claim 2, wherein generating the allocation of the IP entities into the rings further comprises:
    determining second associations of the IP entities with application asset inventory information; and
    reallocating at least a portion of the IP entities among the rings using a rules-based assessment.

4. The computer-implemented method of claim 3 further comprising:
    identifying at least one of anomalies, patterns, or optimization opportunities based at least in part of the first dataset, the first associations, and the second associations, wherein the one or more outputs further comprise the at least one of the anomalies, the patterns, or the optimization opportunities.

5. The computer-implemented method of claim 1, wherein the records comprise System Management Facilities (SMF) Type 119 Subtype 2 records.

6. The computer-implemented method of claim 1, wherein the first dataset further comprises network traffic patterns, traffic volumes, and traffic properties associated with the IP entities.

7. The computer-implemented method of claim 1 further comprising:
displaying one or more visualizations based at least in part on information in the first dataset, wherein the one or more visualizations comprise a diagrammatic visualization comprising representations of LPARs of the mainframe computing system, system groups of the IP entities, and respective volumes of network traffic between the mainframe computing system and the system groups of the IP entities for the time period.

8. The computer-implemented method of claim 7, wherein the one or more visualizations further comprise a first table showing, for each system group of the system groups for the time period:
a respective traffic total to and from the mainframe computing system for the system group;
a respective number of the IP entities in the system group; and
a respective number of TCP connections between the system group and the mainframe computing system.

9. The computer-implemented method of claim 8, wherein the one or more visualizations further comprise a second table showing, for each day of weeks of the time period:
a respective traffic total to and from the mainframe computing system; and
a respective number of TCP connections to the mainframe computing system.

10. The computer-implemented method of claim 9, wherein the one or more visualizations further comprise a third table showing network traffic segmented by mainframe services and mainframe services groupings.

11. A system comprising one or more processors and one or more non-transitory computer-readable media storing computing instructions that, when executed on the one or more processors, cause the one or more processors to perform operations comprising:
obtaining records of TCP communications for a mainframe computing system for a time period;
generating, using the records, a first dataset comprising an inventory of IP entities that communicated with the mainframe computing system over TCP during the time period;
generating an allocation of the IP entities into rings representing respective potential latency sensitivities; and
causing to be displayed one or more outputs comprising the allocation of the IP entities.

12. The system of claim 11, wherein the operations further comprise:
determining first associations of the IP entities with IT asset inventory information.

13. The system of claim 12, wherein generating the allocation of the IP entities into the rings further comprises:
determining second associations of the IP entities with application asset inventory information; and
reallocating at least a portion of the IP entities among the rings using a rules-based assessment.

14. The system of claim 13, wherein the operations further comprise:
identifying at least one of anomalies, patterns, or optimization opportunities based at least in part of the first dataset, the first associations, and the second associations, wherein the one or more outputs further comprise the at least one of the anomalies, the patterns, or the optimization opportunities.

15. The system of claim 11, wherein the records comprise System Management Facilities (SMF) Type 119 Subtype 2 records.

16. The system of claim 11, wherein the first dataset further comprises network traffic patterns, traffic volumes, and traffic properties associated with the IP entities.

17. The system of claim 11, wherein the operations further comprise:
displaying one or more visualizations based at least in part on information in the first dataset, wherein the one or more visualizations comprise a diagrammatic visualization comprising representations of LPARs of the mainframe computing system, system groups of the IP entities, and respective volumes of network traffic between the mainframe computing system and the system groups of the IP entities for the time period.

18. The system of claim 17, wherein the one or more visualizations further comprise a first table showing, for each system group of the system groups for the time period:
a respective traffic total to and from the mainframe computing system for the system group;
a respective number of the IP entities in the system group; and
a respective number of TCP connections between the system group and the mainframe computing system.

19. The system of claim 18, wherein the one or more visualizations further comprise a second table showing, for each day of weeks of the time period:
a respective traffic total to and from the mainframe computing system; and
a respective number of TCP connections to the mainframe computing system.

20. The system of claim 19, wherein the one or more visualizations further comprise a third table showing network traffic segmented by mainframe services and mainframe services groupings.

* * * * *